(12) United States Patent
Martin et al.

(10) Patent No.: US 9,500,749 B2
(45) Date of Patent: Nov. 22, 2016

(54) DEVICE FOR RECEIVING RADIO-NAVIGATION SIGNALS WITH MULTIPLE ANTENNAS AND COMMON SYNCHRONIZATION SLAVING

(71) Applicant: THALES, Neuilly-sur-Seine (FR)

(72) Inventors: Nicolas Martin, Bourg les Valence (FR); Vincent Chopard, Tournon sur Rhone (FR); David Depraz, Valence (FR)

(73) Assignee: Thales, Courbevoie (FR)

( * ) Notice: Subject to any disclaimer, the term of this patent is extended or adjusted under 35 U.S.C. 154(b) by 919 days.

(21) Appl. No.: 13/847,390

(22) Filed: Mar. 19, 2013

(65) Prior Publication Data

US 2013/0249735 A1 Sep. 26, 2013

(30) Foreign Application Priority Data

Mar. 22, 2012 (FR) ...................................... 12 00855

(51) Int. Cl.
*G01S 19/37* (2010.01)
*G01S 19/29* (2010.01)
*G01S 19/14* (2010.01)
*G01S 19/36* (2010.01)

(52) U.S. Cl.
CPC ................ *G01S 19/29* (2013.01); *G01S 19/14* (2013.01); *G01S 19/36* (2013.01)

(58) Field of Classification Search
CPC ......... G01S 19/29; G01S 19/14; G01S 19/36
USPC .................................................. 342/357.77
See application file for complete search history.

(56) References Cited

U.S. PATENT DOCUMENTS

| 2002/0033766 | A1 | 3/2002 | Pratt | |
| 2002/0075945 | A1* | 6/2002 | Farine | G01S 19/23 375/148 |
| 2010/0328155 | A1 | 12/2010 | Simic et al. | |
| 2011/0309978 | A1* | 12/2011 | Matsumoto | G01S 19/30 342/357.77 |
| 2012/0154212 | A1 | 6/2012 | Simic et al. | |

OTHER PUBLICATIONS

Institut National De La Propriete Industrielle; Preliminary Search Report; Mar. 4, 2013, Paris, France.
Patrick C. Fenton et al.; Usng GPS for Positon and Attitude Determination of the Canadan Space Agency's Active Rocket Mission; Sep. 15, 1998; Nashville, Tennessee USA.
Jose M. Blas et al.; A low Cost GPS Adaptive Antenna Array; Proceedings of the 1999 National Technical Meeting of the Institute of Navigation; Jan. 25, 1999; San Diego, California USA.

* cited by examiner

*Primary Examiner* — Frank J McGue
(74) *Attorney, Agent, or Firm* — Michael J. Donohue; Davis Wright Tremaine LLP

(57) ABSTRACT

The invention relates to a device for receiving satellite radio-navigation signals comprising a plurality of receiving antennas forming an antenna array. The invention consists in using a plurality of antennas disposed around the circumference of a carrier, in demodulating the signals received by each antenna separately and then in combining the various demodulated signals, thereby amounting to effecting a beam forming in an equivalent antenna pattern. The invention then requires only a single synchronization slaving for the set of demodulation pathways.

6 Claims, 2 Drawing Sheets

DEVICE FOR RECEIVING RADIO-NAVIGATION SIGNALS WITH MULTIPLE ANTENNAS AND COMMON SYNCHRONIZATION SLAVING

FIELD OF THE INVENTION

The subject of the present invention is a multi-antenna radio-navigation signals receiving device.

The field of the invention is that of satellite radio-navigation systems known by the acronym GNSS ("Global Navigation Satellite System") systems such as the GPS or GALILEO systems.

More precisely, the invention relates to radio-navigation signals receivers comprising several receiving antennas.

BACKGROUND OF THE INVENTION

A GNSS receiver can be used on any type of vehicle to determine information about its position, its speed and generally to provide an aid to movement or to navigation.

In particular, such a receiver can be used on a space launcher. The use of a mono-antenna receiver in such a case of application poses a problem since the vertical position of the fuselage of the craft gives rise to a masking of a part of the satellites in view by the body of the launcher for the antennas. The signals transmitted by these satellites will then not be received or be received with a strong attenuation by the receiver. In a more general manner, the positioning of an antenna on the body of a carrier of large wingspan poses the problem of the masking of all or part of the radio-navigation signals emitted by the satellites in view of the carrier by the carrier itself.

A solution making it possible to solve the problem of signals masking consists in using an annular antenna disposed around the circumference of the fuselage of the carrier. In this manner, the signal emitted by a satellite is permanently received by at least one part of the antenna. However, this type of antenna does not make it possible to achieve satisfactory performance since it produces a single signal output which is constructed in a non-optimal manner and which gives rise to significant losses in signal-to-noise ratio.

The invention makes it possible to solve the aforementioned problem by proposing a solution which improves performance with respect to the known receivers. The invention consists in using a plurality of antennas disposed around the circumference of the fuselage of the craft, in demodulating the signals received by each antenna separately and then in combining the various demodulated signals, thereby amounting to effecting a beam forming in an equivalent antenna pattern. The invention then requires only a single synchronization slaving for the set of demodulation pathways.

SUMMARY OF THE INVENTION

The subject of the invention is a device for receiving radio-navigation signals comprising a plurality of receiving antennas forming an antenna array, for each antenna and for each satellite in view of the said device, means for demodulating the signals received comprising means for phase-wise multiplication with a local carrier, means for time-wise correlation with a local code, means for integration of the correlated signal in phase and in time, a carrier NCO numerical control operator able to deliver a local carrier phase for driving the generation of the local carrier and a code NCO numerical control operator able to deliver a time command for driving the generation of the local code and a measurement of the instant of emission by the satellite of the signal received, characterized in that the said device furthermore comprises, for each satellite, means for tracking synchronization of the carrier and of the code comprising:

beam forming means able to deliver, on the basis of the output signals $Z_1$, $Z_2$ of the integration means, a unique formed signal Z equal to the sum of the said signals $Z_1$, $Z_2$ weighted by complex weighting coefficients equal to the product of the gain $G_a$ of the associated antenna with a corrective gain $G_{BL}$ of the lever arm between the phase centre of the antenna and the centre of symmetry O of the antenna array, a code discriminator and a phase discriminator which are applied to the said formed signal Z, a code loop corrector applied at the output of the code discriminator and able to deliver a speed correction as input for the code numerical control operators, a carrier loop corrector applied at the output of the phase discriminator and able to deliver a speed correction as input for the carrier numerical control operators, means for calculating the average of the said measurements of the instant of emission by the satellite of the signal received.

According to a particular aspect of the invention, the receiving antennas are positioned around the circumference of a carrier of substantially cylindrical shape.

According to another particular aspect of the invention, the corrective gain $G_{BL}$ of the lever arm is determined by the following calculation $G_{BL} = \exp(j\Delta\phi_{BL})$, where $\Delta\phi_{BL} = 2\pi \cdot \Delta L_{BL}/\lambda$ is the phase shift induced by the optical path difference $\Delta L_{BL}$ between the phase centre of the antenna and the centre of symmetry O of the antenna array, $\lambda$ being the wavelength of the carrier of the signal received.

According to another particular aspect of the invention, the optical path difference $\Delta L_{BL}$ is determined by projecting the lever arm r onto the view axis between the centre of symmetry O of the antenna array and the satellite.

According to another particular aspect of the invention, the coordinates of the lever arm r are determined, in a spatial reference frame fixed with respect to the earth, on the basis of a measurement of the attitude of the carrier.

In a variant embodiment, the device according to the invention furthermore comprises, at the input of each code numerical control operator and of each carrier numerical control operator, a speed-wise lever arm corrector which consists in compensating the outputs of the code loop corrector and carrier loop corrector by the temporal derivative of the optical path difference $\Delta L_{BL}$.

BRIEF DESCRIPTION OF THE DRAWINGS

Other characteristics and advantages of the present invention will be more apparent on reading the description which follows in conjunction with the appended drawings which represent.

MORE DETAILED DESCRIPTION

Figure 1A:
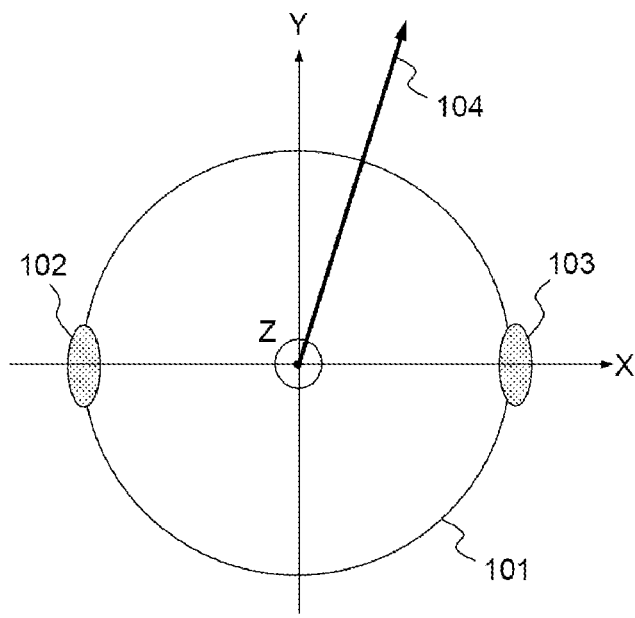
FIG. 1a, a diagram viewed from above and in transverse section of the disposition of the antennas of a receiver according to the invention on the body of a carrier of space launcher type, in an embodiment comprising only two antennas, FIG. 1b, an illustration of the problem of the masking of a satellite by the body of the carrier, FIG. 2, a diagram of the functional architecture of a receiver according to the invention comprising two antennas.

FIG. 1a shows diagrammatically, viewed from above and in transverse section, a carrier 101 of substantially cylindrical shape with two receiving antennas 102,103 positioned around the circumference of the body of the carrier, for example in an equidistributed manner. The axis 104 represents the view axis between the GNSS receiver according to the invention, positioned on the carrier 101, and a radio-navigation satellite. The axis 104 corresponds to the direction of reception of the radio-navigation signal emitted by a satellite. According to the orientation of the view axis 104, the signal received by an antenna 102,103 may be partially or totally masked by the body of the carrier 101.

FIG. 1a represents an exemplary embodiment of the receiver according to the invention comprising two antennas, but an arbitrary number, greater than or equal to two, of antennas is also conceivable. The antennas are disposed preferably around the circumference of the carrier in an equidistributed manner. More generally the antennas are arranged on the body of the carrier so that at each instant, at least one satellite must be in view of at least one antenna without the entirety of the signals received being masked by the body of the carrier.

Figure 1B:
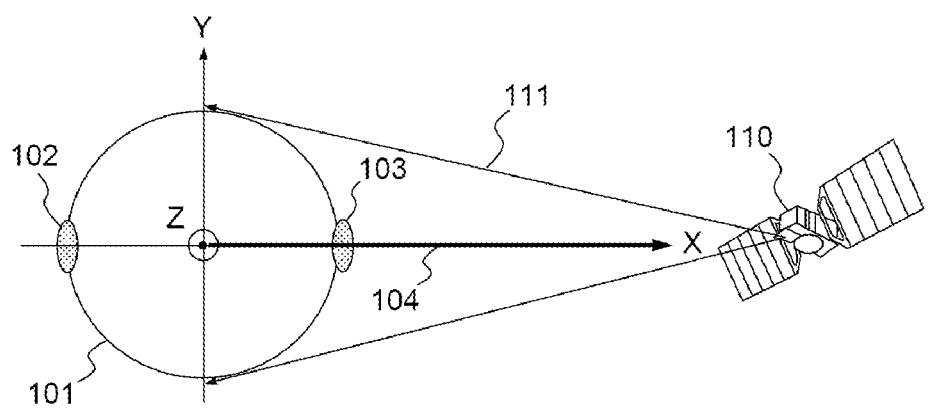

FIG. 1b illustrates a case of masking of a radio-navigation signal 111 emitted by a satellite 110. The signal 111 is correctly received by the antenna 103 disposed in view of the satellite but is not received by the second antenna 102, since it is masked by the carrier 101.

Figure 2:
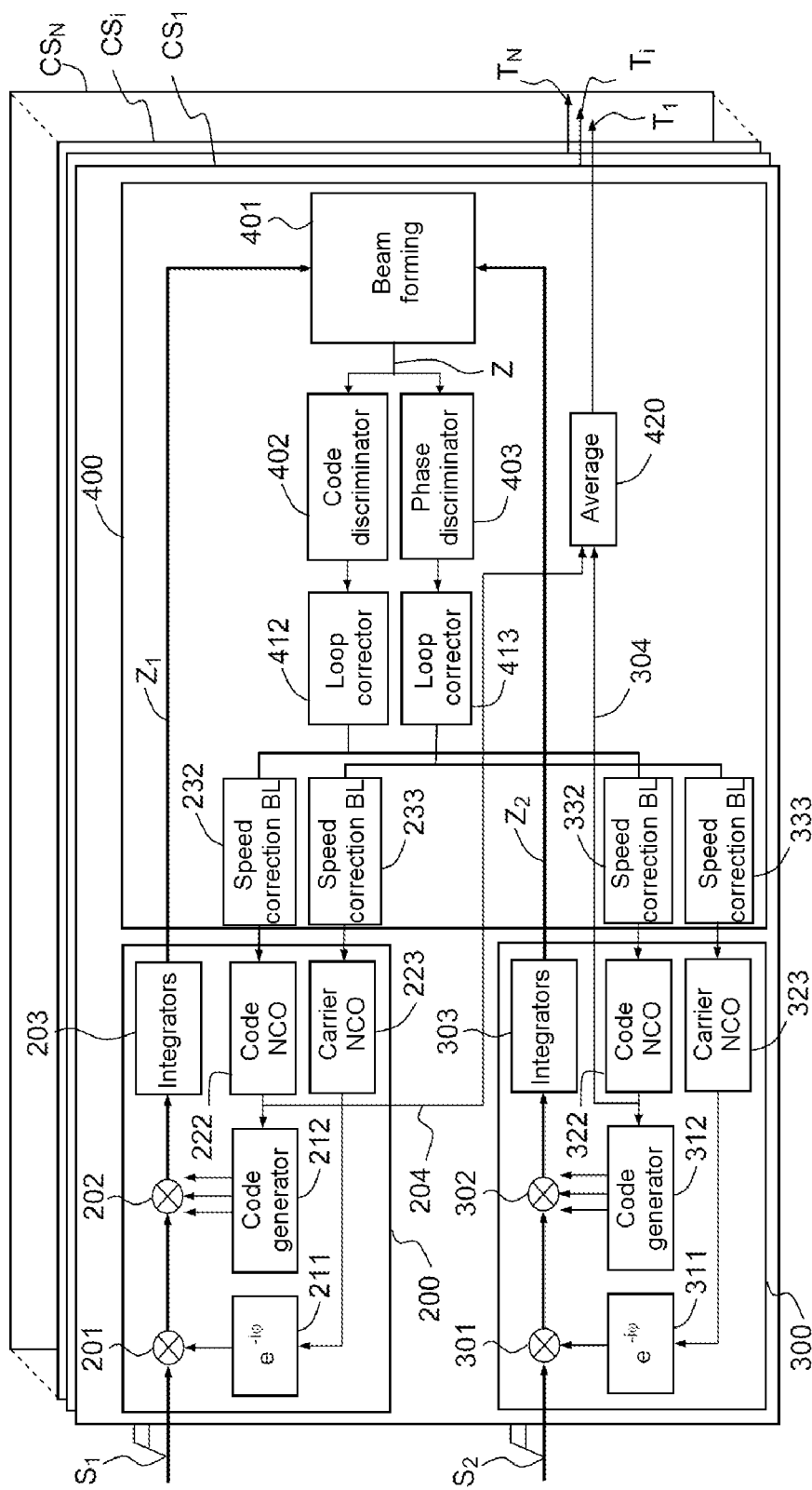

FIG. 2 illustrates on a diagram the functional architecture of a receiver of radio-navigation signals according to the invention comprising two antennas (not represented).

Such a receiver comprises several reception pathways $CS_1, CS_i, \ldots, CS_N$ for each satellite channel, N being equal to the number of radio-navigation satellites in view of the receiver.

The processings implemented for one reception pathway $CS_1$ are now described; these processings are duplicated for each of the other reception pathways.

A demodulation pathway 200, 300 is applied for each signal $S_1, S_2$ received by each of the two antennas. The signal received $S_1, S_2$ is demodulated in phase by multiplication 201, 301 with a local carrier 211, 311 and is despread by correlation 202, 302 with a local code 212, 312.

The local carrier 211, 311 and the local code 212, 312 are generated locally.

The demodulated and despread signal is thereafter integrated by coherent-integration means 203, 303. The set consisting of the phase-wise multiplier 201,301 of the code-wise multiplier 202,302 and of the integration means 203, 303 carries out a correlation in phase and code of the signal received with the local carrier and the local code.

To synchronize the local code and the local carrier to the radio-navigation signal emitted by the satellite and received by the antenna, it is known to use a code loop and a carrier loop per demodulation pathway.

The code loop serves to position a local code in phase with the code contained in the satellite signal $S_1, S_2$ received, so as to carry out a correlation giving the maximum of energy.

The carrier loop serves to slave the frequency or the phase of the local carrier with respectively the frequency or the phase of the carrier received, in order to maximize the result of the correlation.

The presence of a signal as integration output 203, 303 with a significant amplitude, that is to say markedly greater than would be given by the ambient noise in the absence of signal received signifies that the local code and the local carrier are synchronized to the signal received, thereby making it possible to measure at each instant the instant of emission and the Doppler frequency of the signal received, by way of the phase of the local code and of the speed of the phase of the local carrier.

Instead of applying a tracking of synchronization of the code and of the carrier by way of a carrier loop and of a code loop for each demodulation pathway 200, 300, the invention consists in carrying out a single tracking of synchronization 400 for all the demodulation pathways.

Hence, a beam forming module 401 carries out the coherent sum of the complex outputs of the integrators 203, 303 of the set of demodulation pathways 200, 300, taking account of the relative phase shifts between the antennas so as to maximize the total gain of the signal in the direction of the satellite.

For the example of FIG. 2 which is limited to two antennas, the complex signal Z at beam forming output 401 is equal to the combination of the outputs $Z_1, Z_2$ of the integrators 203, 303:

$$Z = C_1 \cdot Z_1 + C_2 \cdot Z_2$$

With $Z_i = I_x + jQ_x$, i=1 or 2, $(I_x, Q_x)$ is the signal at integration output taken early, late or punctual.

The complex gain $C_i$ is equal to the product of the complex gain $G_a$, in amplitude and phase, of the antenna n°i in the direction of the satellite, taking account of a possible masking of the satellite by the body of the carrier, with the complex gain $G_{BL}$ which conveys the compensation of the lever arm between the phase centre of antenna n°i and the centre of symmetry O of the antenna array formed by the set of antennas.

In this manner, a loss of signal on one of the antennas of the receiver does not penalize global operation since the output signal $Z_1, Z_2$ of the corresponding demodulation pathway is weighted accordingly by the antenna gain in the formed signal Z.

We have $G_{BL} = \exp(j\Delta\phi_{BL})$, with $\Delta\phi_{BL} = 2\pi \cdot \Delta L_{BL}/\lambda$ the phase shift induced by the optical path difference $\Delta L_{BL}$ between the phase centre of antenna n°i and the centre of symmetry O of the antenna array formed by the set of antennas.

$\Delta L_{BL}$ is equal to the scalar product between the direction vector u of the view axis 104 of the satellite and the lever arm r joining the centre of symmetry O to the phase centre of the antenna. $\lambda$ is the wavelength of the carrier of the radio-navigation signal.

The coordinates of the lever arm r are calculated in a spatial reference frame fixed with respect to the earth, such as the known ECEF ("Earth Centred Earth Fixed") reference frame. The coordinates of the antennas in an ECEF reference frame are obtained by virtue of a matrix for changing reference frame, provided either by a system for determining the attitude of the carrier external to the invention or by an attitude determination processing carried out directly on the basis of the measurements of the signals received on the various antennas.

The effect of the compensation of the lever arm $G_{BL}$ is to render mutually coherent the measurements arising from the various demodulation pathways 200,300 by taking into account the geometry of the antenna array in order to reduce to a single signal Z viewed from the centre of symmetry O.

In a more general manner, if the receiver comprises M antennas, the formed signal Z is equal to the sum of the output signals $Z_i$ of the M integrators which are multiplied by the complex gains $C_i$ calculated as explained hereinabove for the case of two antennas.

The formed signal Z is thereafter processed by a single code loop and a single carrier loop.

The code loop is composed of a code discriminator 402 which delivers, on the basis of the formed signal Z, an item of information about the temporal shift between the code of the signal received and the local code and of a loop-correcting filter 412 which produces, on the basis of the output of the code discriminator 402, a correction in speed which is thereafter transmitted to a numerical control operator 222,322, also called NCO, which transforms the speed command into a time command which drives the generation of the local code 212,312. Each demodulation line 200, 300 comprises a code NCO 222, 322.

On the basis of the time command provided at the output of the numerical control operator 222, 322, a measurement 204, 304 of the instant of emission of the signal by the satellite is produced for each demodulation pathway 200, 300. These measurements 204, 304 are thereafter averaged 420 in order to deliver a single measurement $T_1$.

The carrier loop serves to slave the phase of the local carrier to the phase of the carrier received to within modulo $2\pi$ with the aim of improving the precision of the code measurement by virtue of a smoothing of the code by the phase of the carrier.

A carrier loop, also called PLL, signifying Phase Lock Loop, uses the punctual correlation pathway and slaves the phase of the local carrier to the phase of the carrier received by a feedback on the local phase. The carrier loop comprises a phase discriminator 403 which measures the deviation between the local phase and the phase received and a loop corrector 413 which filters the output of the phase discriminator 403 and produces a speed correction which is thereafter transmitted to a carrier NCO numerical control operator 223, 323 which transforms the speed command into a local carrier phase which drives the carrier generator 211, 311.

Without departing from the scope of the invention, the carrier loop can also be embodied by a frequency lock loop.

In a variant embodiment of the invention, the synchronization tracking means 400 furthermore comprise, for each demodulation pathway 200, 300, a speed-wise lever arm corrector 232, 332 for the code loop and another speed-wise lever arm corrector 233, 333 for the carrier loop.

The speed-wise lever arm correction consists in calculating the derivative of the optical path difference $\Delta L_{BL}$ with respect to time and in compensating the outputs of the code loop corrector 412 and of the carrier loop corrector 413 by this derivative.

The invention claimed is:

1. Device for receiving satellite radio-navigation signals comprising a plurality of receiving antennas forming an antenna array, for each antenna and for each satellite in view of the said device, demodulator for demodulating the signals received comprising a multiplier for phase-wise multiplication with a local carrier, a correlator for time-wise correlation with a local code, an integrator for integration of the correlated signal in phase and in time, a carrier NCO numerical control operator able to deliver a local carrier phase for driving the generation of the local carrier and a code NCO numerical control operator able to deliver a time command for driving the generation of the local code and a measurement of the instant of emission by the satellite of the signal received, wherein the said device furthermore comprises, for each satellite, a carrier and code tracking loop comprising:
a beamformer able to deliver, on the basis of the output signals $Z_1$, $Z_2$ of the integrator, a unique formed signal Z equal to the sum of the said signals $Z_1$, $Z_2$ weighted by complex weighting coefficients equal to the product of the gain $G_a$ of the associated antenna with a corrective gain $G_{BL}$ of the lever arm between the phase centre of the antenna and the centre of symmetry O of the antenna array;
a code discriminator and a phase discriminator which are applied to the said formed signal Z;
a code loop corrector applied at the output of the code discriminator and able to deliver a speed correction as input for the code numerical control operators;
a carrier loop corrector applied at the output of the phase discriminator and able to deliver a speed correction as input for the carrier numerical control operators; and
a calculator for computing the average of the said measurements of the instant of emission by the satellite of the signal received.

2. Device for receiving radio-navigation signals according to claim 1, wherein the receiving antennas are positioned around the circumference of a carrier of substantially cylindrical shape.

3. Device for receiving radio-navigation signals according to claim 1, wherein the corrective gain $G_{BL}$ of the lever arm is determined by the following calculation $G_{BL}=\exp(j\Delta\phi_{BL})$, where $\Delta\phi_{BL}=2\pi\cdot\Delta L_{BS}/\lambda$ is the phase shift induced by the optical path difference $\Delta L_{BS}$ between the phase centre of the antenna and the centre of symmetry O of the antenna array, $\lambda$ being the wavelength of the carrier of the signal received.

4. Device for receiving radio-navigation signals according to claim 3, wherein the optical path difference $\Delta L_{BS}$ is determined by projecting the lever arm r onto the view axis between the centre of symmetry O of the antenna array and the satellite.

5. Device for receiving radio-navigation signals according to claim 4, wherein the coordinates of the lever arm r are determined, in a spatial reference frame fixed with respect to the earth, on the basis of a measurement of the attitude of the carrier.

6. Device for receiving radio-navigation signals according to claim 1, wherein it furthermore comprises, at the input of each code numerical control operator and of each carrier numerical control operator, a speed-wise lever arm corrector for compensating the outputs of the code loop corrector and carrier loop corrector by the temporal derivative of the optical path difference $\Delta L_{BS}$.

\* \* \* \* \*